Oct. 16, 1934.   R. S. M. MITCHELL   1,977,450
JOINTED LINK AND ARM
Filed Feb. 8, 1932   2 Sheets-Sheet 1
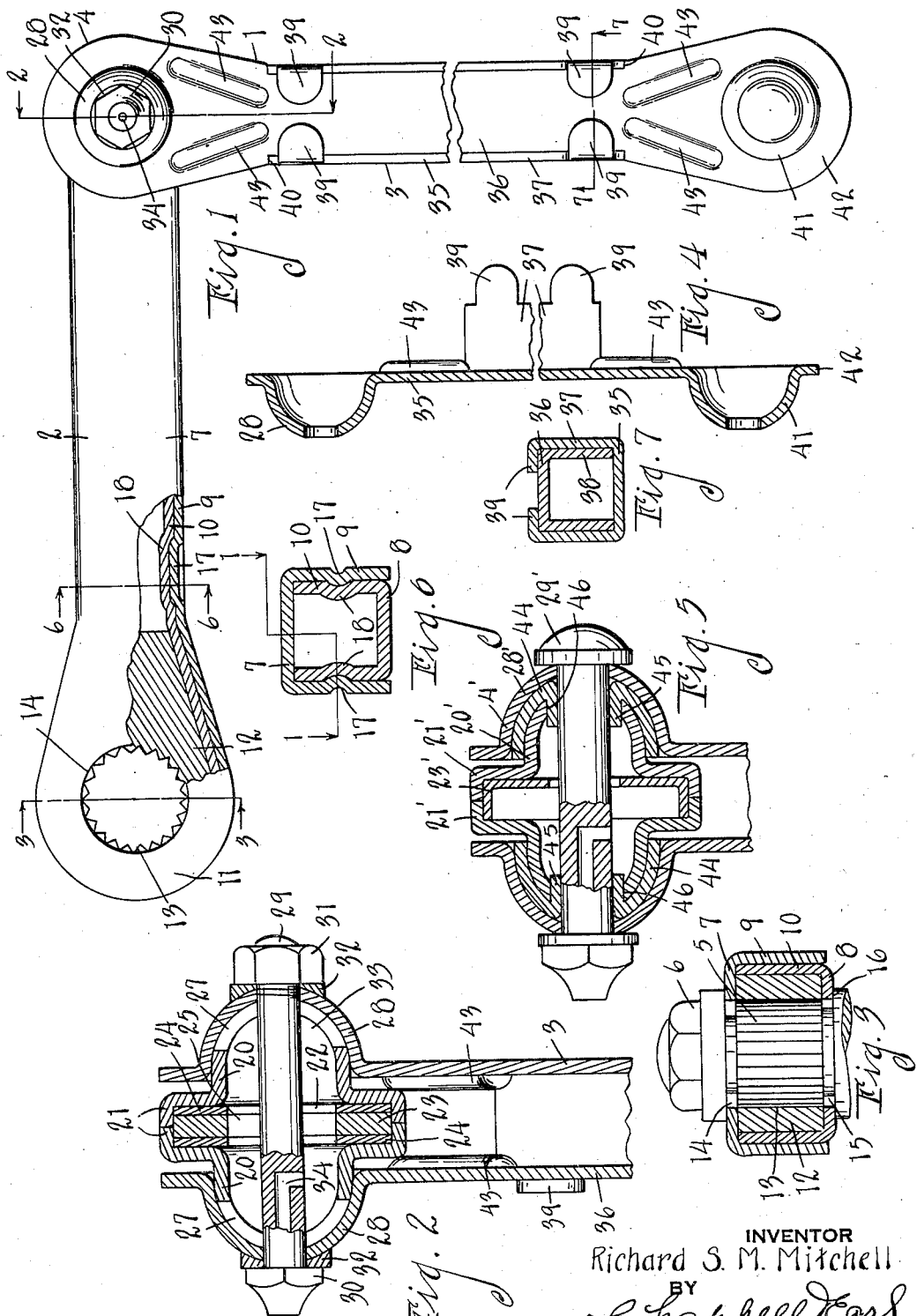
INVENTOR
Richard S. M. Mitchell
BY
Chappell Earl
ATTORNEYS Oct. 16, 1934.  R. S. M. MITCHELL  1,977,450
JOINTED LINK AND ARM
Filed Feb. 8, 1932   2 Sheets-Sheet 2
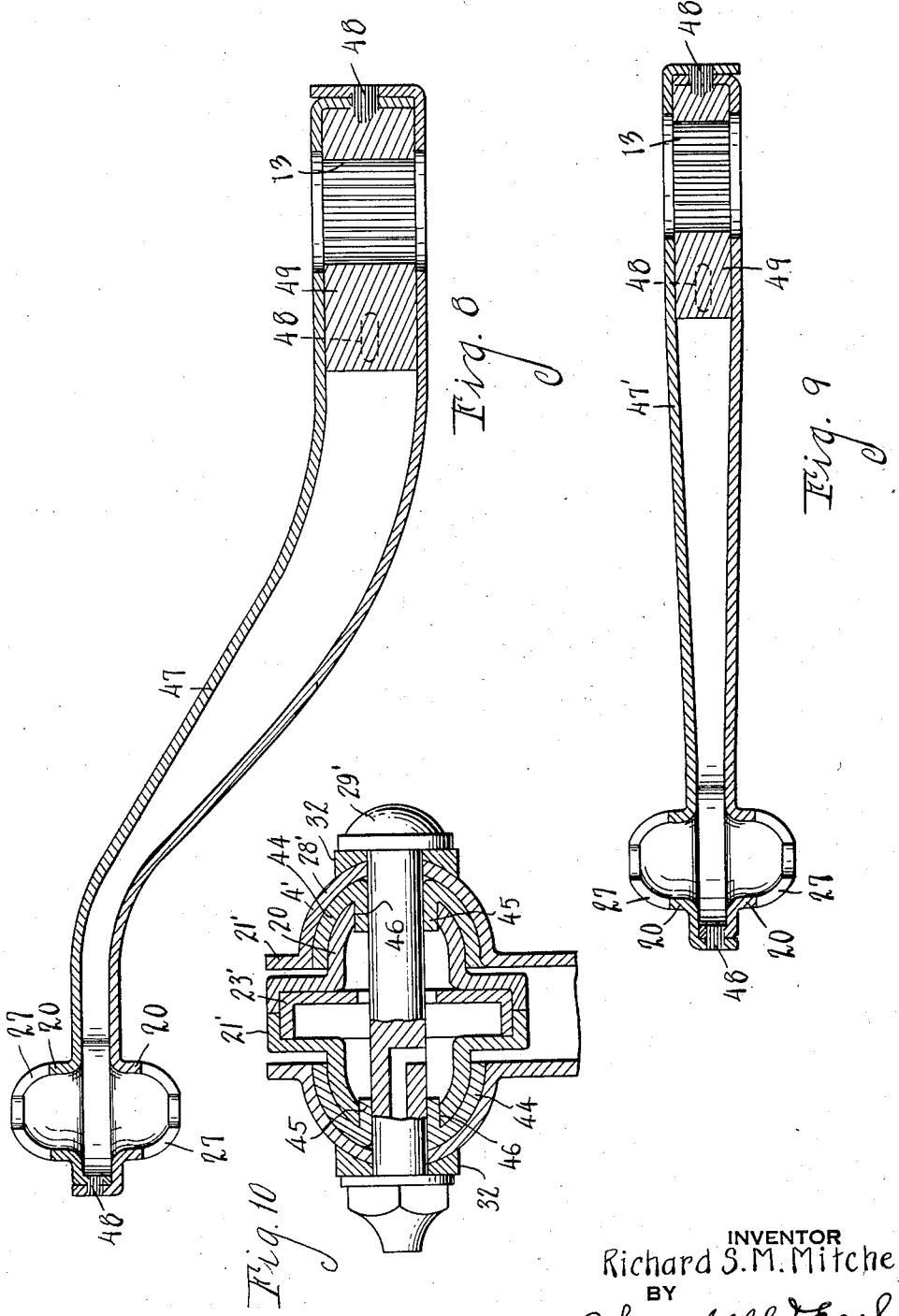
INVENTOR
Richard S. M. Mitchell
BY
Chappell & Earl
ATTORNEYS Patented Oct. 16, 1934

1,977,450

UNITED STATES PATENT OFFICE 1,977,450

JOINTED LINK AND ARM

Richard S. M. Mitchell, Detroit, Mich.

Application February 8, 1932, Serial No. 591,734

6 Claims. (Cl. 287—100)

The main object of my invention is to provide an improved link and arm assembly that is particularly desirable for use in shock absorbers.

Another object is to provide a structural link or lever member that is simple in construction, economical to manufacture, and efficient in operation.

A still further object is to provide an improved oil-tight lubricated joint between two structural members such as the lever or arm and link of a shock absorber.

Objects relating to details and economies of my invention will appear from the description to follow. The invention is defined and pointed out in the claims.

A structure which is a preferred embodiment of my invention is illustrated in the accompanying drawings, in which:

Fig. 1 is a view mainly in side elevation of a jointed link and arm assembly embodying my invention, a portion of the arm being broken away and shown in vertical longitudinal section on line 1—1 of Fig. 6.

Fig. 2 is an enlarged fragmentary detail section of the joint taken on a line corresponding to line 2—2 of Fig. 1.

Fig. 3 is a vertical section taken on line 3—3 of Fig. 1, a shouldered shaft and nut being added.

Fig. 4 is a fragmentary vertical section of one of the sheet metal stampings constituting the link before assembly.

Fig. 5 is a view similar to Fig. 2 of a modification.

Fig. 6 is a vertical transverse section taken on line 6—6 of Fig. 1.

Fig. 7 is a transverse horizontal section taken on line 7—7 of Fig. 1, and

Figs. 8 and 9 are views in longitudinal section of modifications.

Fig. 10 is a view similar to Fig. 5 with the addition of the sealing washers.

Referring to the drawings, numeral 1 in general indicates an assembly embodying my invention, consisting of an arm or lever 2 and a link 3 which are jointed at 4 in a desirable adaptation. The lower end of link 3 is designed to be connected to a part such, for example, as an axle and the arm 2 is connected to a shock absorber through spindle or shaft 5 having a nut 6 threaded to the end thereof.

The arm 2 comprises a pair of sheet metal stampings 7 and 8, both of which are provided with flanges 9 and 10, respectively, forming channels which are telescoped. The enlarged end 11 of the arm 2 is provided with an insert or filler member 12 which is conformed to the shape of the interior of the enlarged end. The filler member 12 is provided with an opening 13 alined with the openings 14 and 15 in the sheet metal stampings for the accommodation of spindle or shaft 5. Shaft 5 is provided with a shoulder 16 which engages the member 8 at the edge of opening 15, and the nut 6 engages the member 7 at the edge of its opening 14 so that when the nut 6 is tightened on shaft 5, the members 7 and 8 are clamped into engagement therewith and with each other.

The walls formed by the flanges 9 and 10 of the members 7 and 8 are provided with co-engaging indentations 17 and 18 which form an interlock between the sheet metal stampings constituting the arm. If desired, the coacting indentations 17 and 18 may be welded together or welding alone may be used for uniting the flanges to secure the members together.

The jointed end 19 of arm 2 is provided with opposed ball portions 20 having abutting flanges 21 extending around the same. The flanges 21 are offset or of substantially L-shape providing a space or recess 22 therebetween, which is filled with a central washer 23 and side or sealing washers 24 having central openings 25 therein so that a single lubricant chamber is provided. The ball portions 20 are provided with radial slots 27 for supplying oil or other lubricant to the contacting surfaces of the ball portions 20 and the overlapping cup-like socket portions 28 of the link 3. The joint 4 is held in assembled relation by the bolt 29 having a head 30 and nut 31 which are provided with sealing washers 32 which engage the outsides of the socket members 28. The joint 4 is substantially oil-tight and provides a chamber 33 which may be filled with a suitable lubricant such as oil. For this purpose, the bolt 29 is provided with an inlet passage way 34. Slots 27 facilitate the lubrication of the joint between the moving surfaces. The members constituting the arm are assembled so that the ball members tend to separate, thereby urging them into their coacting socket members. One or more of the washers 23 and 24 is preferably self-expansible so as to automatically maintain a closed joint.

The link 3 comprises a channel-shaped metal stamping 35 and a channel-shaped metal stamping 36 disposed in oppositely facing telescoped relation. The flanges 37 and 38 of these members are a close or nesting fit. The link members are held toegther by inturned integral ears 39 on the flanges 37, the ears 39 engaging the web of the inner member 36. Relative longitudinal movement between the members 35 and 36 is prevented by abutting shoulders 40 engaging the ends of flanges 38.

The ends of link 3 are provided with opposed cup-like joint socket portions 28 and 41, respectively, provided with flanges 42. Offset or upstruck ribs 43 are also formed near the ends of members 35 and 36 inclined away from each other, as shown, for strengthening the ends against bending or twisting movements.

In the modification of the joint 4', illustrated by Fig. 5, the ball portions 20' and the cup-like portions 28' are spaced apart for the accommodation of a self-lubricating bushing 44 having an inwardly extending flange 45 filling the space between the opening 46 in the end of ball portion 20' and the periphery of bolt 29'. In this modification also, a single expansible washer 23' in the form of a flanged disk is disposed between the flanges 21' of the ball portions 20'. Otherwise, the construction and operation of joint 4' is similar to joint 4 described above.

The jointed arm and link assembly constructed in accordance with my invention is relatively light in weight, simple yet strong in construction, and very economical to manufacture. Furthermore, an oil-tight lubricant chamber is provided on the inside of the joint, whereby the joint is self-lubricating when the chamber is filled with oil or other lubricant. Wear between the friction surfaces is taken care of automatically by the resiliency of the members constituting the arm and the expansible washer or washers disposed between the ball portions of the arm.

Referring to Fig. 8, there is illustrated an arm 47 comprising a pair of sheet metal channels fitted together and spot welded at 48. The insert 49 disposed in one end of the arm is held in place by the welding which unites it with the arm. The arm is bent to offset the ends as shown.

The arm 47' illustrated by Fig. 9 is similarly formed, but is not bent.

My improved structure provides a rigid joint, the movable elements of which, while being flexible in themselves, are susceptible to movement only in one plane. This important feature allows "side sway" and "shimmying" between the chassis and the axle housing of the vehicle, but offers substantial resistance to such movements. In prior structures, the sidewise flexure has been taken care of in the joint, which offers little or no resistance thereto. In my improved structure, the sidewise flexure is not obtained in the joint, which is rigid, but in the flexible members themselves, where the resistance to such flexure is considerable. Furthermore, my structure provides a bearing, which seals the lubricant in and the dust and other foreign matter out. This is a very valuable feature, and one that is new in so far as I am aware.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent is:

1. In a device of the class described, the combination with a lever comprising a pair of telescoped channel-shaped sheet metal stampings having an enlarged end provided with opposed flanged ball portions, an expansible washer separating said ball portions, the ends of said ball portions being open, a link comprising a pair of telescoped channel-shaped sheet metal stampings having an enlarged end provided with spaced flanged semi-spherical opposed socket portions rotatably engaging said ball portions of said lever, said socket portions having alined holes, bushings disposed between said ball portions and said socket portions and having flanges disposed in the open ends of said ball portions, a bolt extending through said holes and clamping said joint portions in assembled relation, and concaved sealing washers disposed between the outsides of said socket portions and the head and nut of said bolt, the interior of the joint forming a lubricating chamber, said bolt having a passage for supplying lubricant to said chamber.

2. In a device of the class described, the combination with a lever comprising a pair of telescoped channel-shaped sheet metal stampings having an enlarged end provided with opposed flanged ball portions, an expansible washer separating said ball portions, the ends of said ball portions being open, a link comprising a pair of telescoped channel-shaped sheet metal stampings having an enlarged end provided with spaced flanged semi-spherical opposed socket portions rotatably engaging said ball portions of said lever, said socket portions having alined holes, bushings disposed between said ball portions and said socket portions and having flanges disposed in the open ends of said ball portions, a bolt extending through said holes and clamping said joint portions in assembled relation, the interior of the joint forming a lubricating chamber, said bolt having a passage for supplying lubricant to said chamber.

3. In a device of the class described, the combination with a lever comprising a pair of telescoped channel-shaped sheet metal stampings having an enlarged end provided with opposed flanged ball portions, an expansible washer disposed between the flanges thereof for separating said ball portions, the ends of said ball portions being open, a link comprising a pair of telescoped channel-shaped sheet metal stampings having an enlarged end provided with spaced flanged semi-spherical opposed socket portions rotatably engaging said ball portions of said lever, said socket portions having alined holes, bushings disposed between said ball portions and said socket portions, a bolt extending through said holes and clamping said joint portions in assembled relation.

4. In a device of the class described, the combination with a lever comprising a pair of telescoped channel-shaped sheet metal stampings having an enlarged end provided with opposed flanged ball portions, an expansible washer disposed between the flanges thereof for separating said ball portions, the ends of said ball portions being open, a link comprising a pair of telescoped channel-shaped sheet metal stampings having an enlarged end provided with spaced flanged semi-spherical opposed socket portions rotatably engaging said ball portions of said lever, said socket portions having alined holes, and a bolt extending through said holes and clamping said joint portions in assembled relation.

5. In a device of the class described, the combination with a lever comprising a pair of telescoped channel-shaped sheet metal stampings having an enlarged end provided with opposed flanged ball portions, a washer disposed between the flanges thereof for separating said ball portions, the ends of said ball portions being open, a link comprising a pair of telescoped channel-shaped sheet metal stampings having an enlarged end provided with spaced flanged semi-spherical opposed socket portions rotatably engaging said ball portions of said lever, said socket portions having alined holes, and a bolt extending through said holes and clamping said joint portions in assembled relation.

6. In a device of the class described, the combination with a flexible lever comprising a pair of telescoped channel-shaped sheet metal stampings having an enlarged end provided with opposed flanged ball portions, a washer disposed between the flanges thereof for separating said ball portions, the ends of said ball portions being open, a flexible link comprising a pair of telescoped channel-shaped sheet metal stampings having an enlarged end provided with spaced flanged semi-spherical opposed socket portions rotatably engaging said ball portions of said lever, said socket portions having alined holes, and a bolt extending through said holes and clamping said joint portions in assembled relation, the link and lever being rotatable in a single plane and the joint therebetween being rigid to sidewise flexure of said members.

RICHARD S. M. MITCHELL.